(12) United States Patent
Starr

(10) Patent No.: US 10,223,442 B2
(45) Date of Patent: Mar. 5, 2019

(54) PRIORITIZING SURVEY TEXT RESPONSES

(71) Applicant: QUALTRICS, LLC, Provo, UT (US)

(72) Inventor: Jeffrey Wade Starr, Orem, UT (US)

(73) Assignee: QUALTRICS, LLC, Provo, UT (US)

( * ) Notice: Subject to any disclaimer, the term of this patent is extended or adjusted under 35 U.S.C. 154(b) by 453 days.

(21) Appl. No.: 14/682,964

(22) Filed: Apr. 9, 2015

(65) Prior Publication Data

US 2016/0299965 A1 Oct. 13, 2016

(51) Int. Cl.
*G06F 17/30* (2006.01)

(52) U.S. Cl.
CPC .. *G06F 17/30696* (2013.01); *G06F 17/30699* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 5,410,724 A | 4/1995 | Worthy | |
| 5,732,257 A | 3/1998 | Atkinson et al. | |
| 7,085,812 B1 | 8/2006 | Sherwood | |
| 7,383,200 B1 | 6/2008 | Walker et al. | |
| 7,509,382 B1 | 3/2009 | Jania et al. | |
| 8,909,587 B2 | 12/2014 | Alush et al. | |
| 2005/0060222 A1 | 3/2005 | White | |
| 2006/0129446 A1* | 6/2006 | Ruhl | G06F 17/30873 705/306 |
| 2007/0244865 A1 | 10/2007 | Gordon et al. | |
| 2009/0083096 A1* | 3/2009 | Cao | G06Q 10/00 705/7.32 |
| 2009/0287642 A1 | 11/2009 | Poteet et al. | |
| 2011/0076663 A1 | 3/2011 | Krallman et al. | |
| 2013/0297292 A1 | 11/2013 | Agarwal | |
| 2013/0339074 A1 | 12/2013 | Nagy et al. | |
| 2014/0149836 A1 | 5/2014 | Bedard et al. | |
| 2014/0234810 A1* | 8/2014 | Flor | G09B 7/02 434/169 |
| 2014/0289231 A1 | 9/2014 | Palmert | |
| 2014/0310062 A1* | 10/2014 | Klein | G06Q 30/0203 705/7.32 |
| 2014/0358636 A1 | 12/2014 | Nowak et al. | |
| 2015/0324811 A1 | 11/2015 | Courtright et al. | |
| 2016/0019569 A1 | 1/2016 | Jaggi et al. | |
| 2016/0110789 A1* | 4/2016 | Gilb | G06Q 30/0282 705/26.44 |
| 2016/0180359 A1 | 6/2016 | Qu | |

(Continued)

OTHER PUBLICATIONS

U.S. Appl. No. 14/727,511, Jun. 21, 2017, Office Action.

(Continued)

*Primary Examiner* — Anhtai V Tran
(74) *Attorney, Agent, or Firm* — Keller Jolley Preece

(57) ABSTRACT

Embodiments of the present disclosure generally relate to organizing textual responses, such as survey responses. More specifically, one or more embodiments of the present disclosure provide a reviewer with textual responses that are prioritized according to usefulness. As an example, one or more embodiments of the present disclosure provide a reviewer with a notability value that provides an indication of the usefulness and/or interestedness of a response in relation to other responses for a particular open or textual type question.

20 Claims, 7 Drawing Sheets

(56) References Cited

U.S. PATENT DOCUMENTS

| | | |
|---|---|---|
| 2016/0196491 A1 | 7/2016 | Chandrasekaran et al. |
| 2016/0350771 A1 | 12/2016 | Gardner |
| 2017/0124174 A1 | 5/2017 | Starr et al. |
| 2018/0005289 A1 | 1/2018 | Angell et al. |
| 2018/0032606 A1 | 2/2018 | Tolman et al. |
| 2018/0240138 A1 | 8/2018 | Le et al. |

OTHER PUBLICATIONS

"A Literature Survey on Fatigue Analysis Approaches for Rubber", by W Mars and F Fatemi, Department of Mechanical, Industrial, and Manufacturing Engineering, University of Toledo, Toledo, OH 43606-3390, USA, International Journal of Fatigue 24, pp. 949-961, 2002. (Year: 2002).

U.S. Appl. No. 14/727,511, Jan. 29, 2018, Office Action.

U.S. Appl. No. 14/727,511, Aug. 10, 2018, Office Action.

U.S. Appl. No. 14/927,256, May 31, 2018, Office Action.

Matthias Schonlau et al. "Conducting Research Surveys via E-mail and the Web" © 2002 RAND Corporation, ISBN/EAN: 0-8330-3110-4. Retrieved from https://www.rand.org/pubs/rnonographreports/MR1480.html (Year: 2002).

No Author "Creating and using online surveys" University of Exeter Jul. 2012. Retrieved from https://as.exeterac.uk/nnedia/universityofexeter/acadernicservices/educationenhancernent/cascade/Creating and using online surveys.pdf (Year: 2012).

U.S. Appl. No. 14/927,256, filed Nov. 1, 2018, Office Action.

U.S. Appl. No. 15/199,678, filed Oct. 1, 2018, Office Action.

\* cited by examiner

PRIORITIZING SURVEY TEXT RESPONSES

BACKGROUND

1. Technical Field

One or more embodiments of the present disclosure relate generally to systems and methods for organizing responses to a survey question. More specifically, one or more disclosed embodiments relate to systems and methods for prioritizing text responses from a plurality of users.

2. Background and Relevant Art

Companies often rely on opinions and feedback from past customers to improve the experience of current and future customers. A common method of acquiring feedback is through customer surveys, including customer ratings and reviews (e.g., ratings and reviews for products, services, businesses, etc.). For example, a company may use feedback obtained from a survey administered to one or more past customers to improve future customer experience with the company.

Due to the development of electronic communication technologies, many surveys are administered to survey respondents via the Internet as electronic surveys. Typical electronic surveys can include various types of questions, for example, some types of questions include categorical (e.g., multiple-choice), scalar (e.g., select or enter a quantity), or open/textual (e.g., leave a response with regard to the following topic, product, or service) questions. Due to the ease of distributing electronic surveys, as well as collecting responses to electronic surveys, the number of responses to an electronic survey may easily be in the hundreds of thousands, or even millions. For categorical and scalar type questions, techniques exist for summarizing and presenting a visual representation for all responses to a given question. For open or textual responses, however, there currently exist a number of problems in identifying, classifying, summarizing, and organizing responses, especially in the case of electronic surveys that can produce a large quantity of responses.

As an initial problem, not all textual responses include equally valuable information. Often, many textual responses include fairly useless information, or "noise." For example, when a respondent provides the answer "no," "none," "no response," "no comment," or "I don't know" as their response to an open or textual question, such responses typically create noise, but do not provide any valuable insight. As an additional example, while some responses to an open or textual question appear at first glance to be valuable, the responses merely express emotions without providing useful information. In a similar manner, some responses appear to be valuable because of their length, but long responses often do not include any actionable or useful information despite their length.

Despite the efficiencies provided by electronic survey technology, many conventional systems require that a reviewer read each response to an open or textual question—a process that is both labor-intensive, time consuming, and expensive. Further, the review process can become highly repetitious and boring for a reviewer. Moreover, not only can reviewing a large number of responses be very time consuming, boring, and repetitious, but by the time a reviewer identifies an issue, the time to act on the issue may have passed.

In addition to the above disadvantages, many conventional systems also have the disadvantage of lacking the ability to organize and/or otherwise provide textual responses in a manner that allows reviewers to quickly identify an issue, and thus quickly respond to customer feedback by implementing a solution. In general, conventional systems typically present textual responses in reverse chronological order. While, sorting responses with the most recent responses first may assist a reviewer in viewing the most recent responses, many quality and/or important responses will be moved continually deeper into the reviewer's queue, and may never be addressed. As an alternative, some conventional systems sort responses in order from longest to shortest. As described above, however, response length alone does not indicate whether a response will be useful or interesting.

In addition to the inability of conventional systems to effectively organize textual responses, some conventional systems attempt to analyze and organize textual responses by comparing textual responses to each other. Organizing textual responses based on comparing responses to each other, however, presents a number of additional drawbacks. For example, comparing responses to each other requires that responses be in a particular language (e.g., all responses in English). Furthermore, in order to adequately compare responses, a minimum number of responses must be obtained before the responses can effectively be compared with each other.

Accordingly, these and other disadvantages exist with respect to conventional systems and methods for organizing textual responses.

SUMMARY

Embodiments of the present disclosure provide benefits and/or solve one or more of the foregoing or other problems in the art with systems and methods for organizing textual responses. For example, the systems and methods disclosed herein provide a reviewer with textual responses prioritized according to usefulness. As a further example, the systems and methods disclosed herein provide a reviewer with a notability value that provides an indication of the usefulness and/or interestedness of a response in relation to other responses for a particular open or textual type question.

To illustrate by way of example, in one or more embodiments, the systems and methods may obtain a group of responses, such as survey responses, that relate to a response item (e.g., a question or prompt). The systems and methods may determine a notability value for each response. For instance, the notability value can be based on the character length, text entropy, and readability of each response. The systems and methods can arrange the response based on their respective notability value. Further, the systems and methods can present the organized responses, along with their respective notability values, to a reviewer.

In some embodiments, the systems and methods may filter responses based on parts of speech identified in each response before determining a notability score for each response. For example, the systems and methods may identify whether a response includes multiple parts of speech, such as a noun, a verb, an adjective, and an adverb. The systems and methods may filter out responses that do not include each of the parts of speech and determine a notability score for any remaining responses. Thus, the systems and methods can eliminate noisy responses before determining notability scores for the responses.

As discussed in greater detail below, the systems and methods disclosed herein provide improvements over conventional systems and methods by organizing responses according to usefulness and interestedness. Further, the systems and methods allow a reviewer to quickly identify, implement, and address responses without having the reviewer sort through responses containing noise. Additionally, because the systems and methods determine a notability score for each response, the systems and methods can organize responses immediately, as well as organize a large number of responses in a short time period. Moreover, the systems and methods disclosed herein can work in a variety of languages.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which.

DETAILED DESCRIPTION

Figure 1:
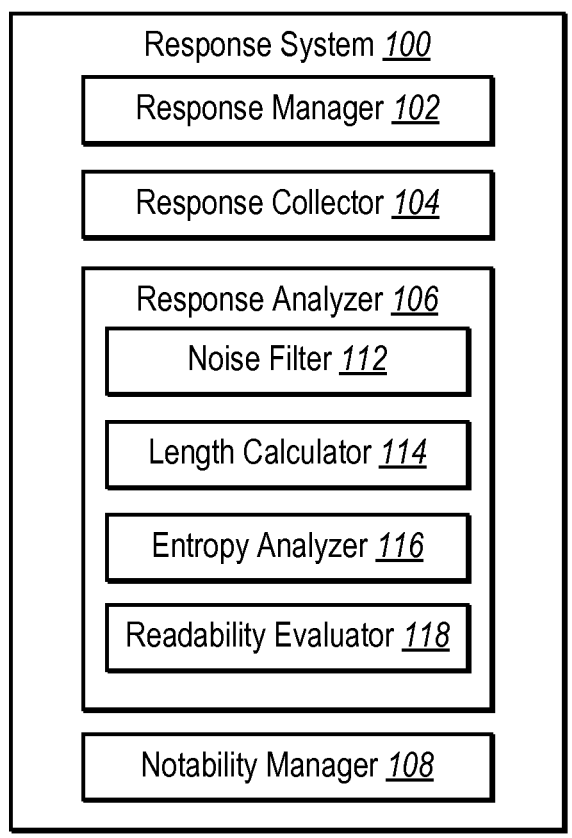
FIG. 1 illustrates a schematic diagram of an exemplary response system in accordance with one or more embodiments.

The embodiments disclosed herein provide a response system that organizes textual responses. In particular, the response system provides textual responses arranged according to usefulness to a user that reviews the responses (i.e., a reviewer). In addition, not only can the response system organize responses according to usefulness, but the response system can also provide a reviewer with an indication of how a response compares to other textual responses for the same question or prompt. Further, the response system can provide a number of useful features that benefit both respondents and reviewers, as described below.

In particular, in one or more embodiments, the response system provides a reviewer with a notability value for each response that indicates the usefulness or interestedness of a response. To illustrate, the response system may obtain a set of responses that relate to a response item. For example, the response system may receive responses to a question or prompt in a survey, such as "How can we improve your customer experience?" or "Please provide a review for Product X." The response system may determine a notability value for each response. In some instances, the response system determines the notability value based on a character length value, text entropy value, readability value, and/or other values and factors. The response system can arrange responses based on notability values that correspond to each response. After arranging the responses, the response system can present the organized responses, along with their respective notability values, to a reviewer.

In some embodiments, the response system can further reduce the number of responses that a reviewer needs to review. More specifically, before determining a notability score for each response, the response system can filter out the responses that do not include multiple (e.g., two or more) parts of speech. Responses that include multiple parts of speech often correlate to more useful, interesting, and thoughtful responses. Further, filtering out responses that do not include multiple parts of speech can remove responses that contain noise, as well as remove longer responses that do not contain useful or actionable information. In addition, by reducing the total number of responses, the response system requires less time to determine notability values for the remaining responses.

As mentioned above, the response system provides a number of advantages. For example, the response system prioritizes responses according to usefulness and interestedness. In some example embodiments, the response system can prioritize and organize responses to surveys and questionnaires. In other embodiments, the response system can prioritize and organize other types of responses, such as movie summaries, short essays, item descriptions, or other texts. Additionally, the response system reduces the number of responses that a reviewer needs to review by filtering out responses that include noise or that are not actionable, such as responses that are purely emotional, include ramblings, or are primarily gibberish.

As another advantage, the response system allows a reviewer to quickly address, implement, and respond to useful and interesting responses. In particular, because the reviewer is presented with useful and interesting responses first, the reviewer can respond to these responses without hunting through a number of noisy responses. Further, because interesting responses are grouped together and presented to the reviewer first, the responses are less likely to be repetitious. Thus, the reviewer can review the responses without getting bored or distracted.

As an additional advantage, the response system can process responses in multiple languages. In some embodiments, the response system can evaluate responses in multiple languages without changing or adjusting how notability values are calculated. Further, the response system can rank two responses for the same prompt or question, even if the two responses are written in different languages. Thus, unlike conventional systems, the response system is not restricted to evaluating responses only in a single language, such as English.

Furthermore, the response system can be used to prioritize responses from multiple sources and sites without requiring a large amount of administrative overhead to individually tailor analytics to each question set. To illustrate, in some instances, the response system may be used to prioritize textual responses from different surveys without requiring the response system to be retooled or adjusted. In other words, the response system can accomplish prioritizing and ranking responses without the need of administrative overhead.

Another advantage is that the response system can immediately assign a notability score to a response as soon as the response arrives rather than waiting for a minimum number of responses to accumulate. In other words, because the response system does not compare responses to each other, the response system can start processing responses as soon as a respondent enters a response. Further, when a new response arrives, the response system can immediately determine if the response is interesting or useful.

As used herein, the term "response" refers to any type of electronic data provided by a respondent. For instance, the electronic data can include feedback, such as text feedback. The feedback can include a string of characters that form text. A respondent may provide feedback when answering a response item. The term "response item" may refer to a question or a prompt that allows a respondent to provide a response. For example, a question may ask a respondent for feedback on a service, product, or experience (e.g., movie summaries, short essays, or other texts). A prompt may be a statement asking a respondent to provide additional comments or feedback, such as "tell us how we can improve" or "leave a comment below."

FIG. 1 illustrates a schematic diagram of a response system 100 in accordance with one or more embodiments. The response system 100 can include various components for performing the processes and features described herein. For example, in the illustrated embodiment, the response system 100 includes a response manager 102, a response collector 104, a response analyzer 106, and a notability manager 108. In addition, the response system 100 may include additional components not illustrated, such as those as described below. The various components of the response system 100 may be in communication with each other using any suitable communications protocols, such as those described with respect to FIG. 6 below.

Each component of the response system 100 may be implemented using one or more computing devices (e.g., server devices) including at least one processor executing instructions that cause the response system 100 to perform the processes described herein. The components of the response system 100 can be implemented by a single server device or across multiple server devices, as described above. Although a particular number of components are shown in FIG. 1, the response system 100 can include more components or can combine the components into fewer components (such as a single component), as may be desirable for a particular implementation.

As illustrated, the response system 100 includes a response manager 102. The response manager 102 can manage the creation of one or more response items. Additionally, the response manager 102 can facilitate the distribution of the response items to respondents. Further, the response manager 102 can manage the gathering and storing of responses provided by respondents as answers to the response items.

In particular, the response manager 102 can assist a user in generating and/or creating a set of response items used to obtain feedback from one or more respondents. To illustrate by way of example, the user may be a survey administrator and the response manager 102 may assist the survey administrator to create and organize a survey that includes one or more questions and/or prompts. For instance, the response manager 102 may assist the survey administrator in creating a survey that includes categorical questions, scalar questions, and/or one or more textual questions. In another example, the user may be a product manager and the response manager 102 may assist the product manager to create a product review prompt to present to customers who have purchased the product.

As part of assisting a user in creating a set of response items to present to respondents, the response manager 102 may suggest additional response items to include in the set of response items. For example, if a user selects a scalar question, the response manager 102 may recommend that the user also add one or more textual questions to ask the respondent depending on the respondent's answer to the scalar question. To illustrate, a survey administrator or product manager may create a scalar question that allows a recipient to rank a satisfaction level with a product from one (1) to ten (10), where one (1) is very unsatisfied and ten (10) is very satisfied. If a respondent marks a low score (e.g., a 1-3), the response manager 102 may suggest that the respondent be asked a follow-up textual question that asks the respondent to explain his or her dissatisfaction with the product and/or what could be done to improve the respondent's satisfaction level. If the respondent marks a high score (e.g., a 8-10), the response manager 102 may suggest that the respondent be asked a follow-up textual question that asks why the respondent is satisfied with the product and/or what the respondent likes about the product.

The response manager 102 may provide other features to assist a user in the creation of questions and/or prompts to present to respondents. For instance, the response manager 102 may provide alternative wording for response items selected by the user. In addition, the response manager 102 may allow the user to review the set of response items as one or more respondents would view the response items. The response manager 102 may also provide additional tools and functionalities to help a user in creating a set of response items.

The response manager 102 may also assist a user in distributing a set of response items. To illustrate, after a user creates a set of response items, the response manager 102 may assist the user in distributing the set of response items to one or more respondents. For example, the response manager 102 may send a message to potential respondents requesting response participation (e.g., please complete this survey). For instance, the response manager 102 may send an email, text message, link, etc., that requests that a respondent provide answers/feedback to the set of response items (e.g., a survey, questionnaire, review, evaluation, etc.). In another example, the response manager 102 may provide a prompt on a website that allows respondents to openly comment on the set of response items. For instance, the response manager 102 may post a response item (e.g., a question or prompt) and allow respondents to openly respond, such as asking respondents to review a product, service, company, or experience.

The response manager 102 may also gather and store responses provided by respondents. The response manager 102 can store the responses for a set of responses item together, for example, in a response database. In some instances, the response manager 102 may gather and store responses to a response item together. To illustrate, if a set of responses includes two response items, then the response manager 102 can store responses for the first response item together and responses for the second response item together.

In some example embodiments, the response manager 102 may be located outside of the response system 100. In other words, the response manager 102 may be part of a system that is outside of the response system 100, such as a system belonging to a third-party. For example, the response manager 102 may, apart form the response system 100, create and distribute response items as well as gather and store responses from respondents with respect to the response items.

Regardless of whether the response manager 102 operates as part of the response system 100 or another system, the response system 100 can collect responses to response items provided by respondents. In particular, the response collector 104 illustrated in FIG. 1 may obtain responses that are provided by respondents. For instance, the response collector 104 may obtain responses that are stored on the response system 100. Additionally or alternatively, the response collector 104 may obtain responses stored on an outside storage device or on a system belonging to a third-party.

The response collector 104 may collect responses in a variety of ways. To illustrate, the response collector 104 may extract responses to a response item in bulk. For example, the response collector 104 may collect a list of multiple responses to a response item. In addition, or in the alternative, the response collector 104 may collect responses to a response item as respondents provided their responses. For example, when a respondent provides a response to a response item, the response collector 104 may soon after collect the response.

Once the response collector 104 collects one or more responses, the response system 100 can analyze the responses. In particular, the response analyzer 106 illustrated in FIG. 1 can analyze the collected responses. As illustrated, the response analyzer 106 may include a noise filter 112, a length calculator 114, an entropy analyzer 116, and a readability evaluator 118. While not illustrated, the response analyzer 106 may also include other response analyzers, which are described below.

The noise filter 112 may detect and filter out responses that are noise. In general, the noise filter 112 detects and filters out responses that are noise. A response may be noise if the response is blank. In addition, a response may be noise if the response does not include actionable items or issues. Example responses include responses that only provide a minimal answer such as "no," "none," "no response," "no comment," "n/a," "like it," "love it," "don't like it," "hate it," "I don't know," etc. Additional examples of noise responses include responses that provide primarily emotional sentiment about a service or product, but lack any useful or interesting feedback that a reviewer can act upon.

Responses that include noise are generally shorter in length. Just because a response is short, however, does not mean that a response is noise. For example, a short response may include an actionable item. Similarly, longer responses do not automatically indicate actionable items. For example, a respondent may provide a longer response, but the response may only include emotional sentiment or otherwise focus on a service or product without providing useful or interesting feedback upon which a reviewer can act. Accordingly, the noise filter 112 can use other methods to determine whether a response is noise or whether the response may contain actionable text.

To illustrate, in some example embodiments, the noise filter 112 may analyze the complexity of the response to determine whether the response is noise. In particular, the noise filter 112 may analyze parts of speech in a response to determine if a response is noise. When a respondent includes various parts of speech, there is a greater likelihood that the response is not noise because respondents who choose to include multiple parts of speech often provide actionable items in their responses and/or provides useful responses.

More specifically, the noise filter 112 may determine whether a response is noise based on parts of speech within a response. Examples of parts of speech can include a noun, verb, adjective, adverb, pronoun, preposition, conjunction, interjection, determiner, or article. As an initial matter, the noise filter 112 may identify parts of speech in a response by comparing each word in the response to known parts of speech. In particular, the noise filter 112 can tokenize the response, which is a string of text, to obtain individual words. After obtaining words in the response, the noise filter 112 can compare each word to a parts of speech dictionary.

To illustrate, after the noise filter 112 obtains the word "red," the noise filter 112 can determine that the word red is both a noun and an adjective. More specifically, the noise filter 112 can compare the word red to a noun dictionary to determine if the word red is a noun. Similarly, the noise filter 112 can compare the word red to other parts of speech dictionaries (e.g., verb, adverb, adjective, etc.) to determine whether the word red qualifies as another part of speech. Alternatively, the noise filter 112 may compare the word red to a combined parts of speech dictionary or table that identifies the word red as both a noun and an adjective.

As another illustration, the noise filter 112 may compare the word "well" to the combined parts of speech dictionary to determine that the word well is a noun, verb, adjective, adverb, and interjection. Likewise, the noise filter 112 may compare the word "substantial" to the combined parts of speech dictionary to determine that the word attractive is only an adjective.

Regardless of the method used to determine parts of speech in a response, as mentioned above, the noise filter 112 may determine whether a response is noise based on what parts of speech are identified within a response. For example, in some example embodiments, the noise filter 112 may determine that a response is noise if the response does not include a minimum number of different parts of speech. For example, the noise filter 112 may determine that a response is noise when the response includes less than three (3) different parts of speech. In another example, the noise filter 112 may determine that a response is noise unless the response includes at least five (5) different parts of speech. One will appreciate that the number of different speech parts required for the noise filter 112 to not consider a response noise may vary.

Further, when determining if a response includes multiple different speech parts, the noise filter 112 may only count one part of speech per word at a time. In other words, because the word "well" can be used as one of five parts of speech, as described above, the word well along cannot satisfy the condition that a response include at least four different parts of speech. Depending on the other words in the response, however, the word well may count as any one of the five parts of speech to which it belongs.

In one or more embodiments, the noise filter 112 may determine that a response is noise if the response does not include one or more specific parts of speech. For example, the noise filter 112 may determine responses that do not include a noun, a verb, and an adjective are noise. In another example, the noise filter 112 may determine that responses that do not include a noun, a verb, an adverb, and an adjective are noise. In additional embodiments, the noise filter 112 may determine that a response is noise unless the response includes one or more specific parts of speech as well as a minimum number of other parts of speech. For example, the noise filter 112 may determine that a response is noise unless the response includes a noun, a verb, and an adjective as well as two other parts of speech. One will appreciate that the noise filter 112 can apply other combinations that require specific parts of speech present and/or a minimum number of parts of speech when determining if a response is a noise.

As mentioned above, the response analyzer 106 may use the noise filter 112 to identify and filter out responses that are noise. By initially filtering out responses that are noise, the response analyzer 106 can concentrate on analyzing and organizing non-noise responses. Accordingly, the response analyzer 106 can perform additional analytics on the non-noise responses, as described below. Alternatively, the response analyzer 106 may determine not to filter out responses for noise or may perform additional analytics on all responses to a response item regardless of if the response is noise or not. For example, the response analyzer 106 may prioritize responses that are non-noise over responses that are noise when performing additional analytics on the responses.

As one example of additional analytics that the response analyzer 106 can perform, the response analyzer 106 can determine different lengths of responses. In particular, the response analyzer 106 may use the length calculator 114 to calculate the length characteristics of each response. For example, the length calculator 114 may calculate a length value based on the number of characters in a response, with or without including spaces. Additionally or alternatively, the length calculator 114 may calculate a length value based on the number of words in the response that are above a threshold character length. For example, the length calculator 114 may calculate a length value based on the number of words in a response that contain four (4) or more characters.

As another example, the response analyzer 106 may include an entropy analyzer 116. In general, the entropy analyzer 116 determines an entropy value for each response. The entropy value can measure proportional character uniformity and word variations. In other words, the entropy value can measure the amount of character and word variation that exists in a response. For instance, a response may include low entropy if the response is repetitive and contains many of the same characters or words, such as a response that states, "I really really really love this product!!!" Conversely, a response will have higher entropy when the response includes a variation of characters and words used throughout the response.

To illustrate, in one or more embodiments, the entropy analyzer 116 may determine an entropy value for a response based on the ratio of how often each character in the response is used compared to the total number of characters included in the response. For example, the following formula may be used to determine an entropy value:

$$e(t) = -\sum_{c}^{t} \frac{\text{count}(c)}{\text{length}(t)} \log_2 \frac{\text{count}(c)}{\text{length}(t)}$$

where t is a string of characters (e.g., a response), c is a character in string t, count(c) is the number of times c appears in string t, length(t) is the length of string t, and e(t) is the entropy value. In many cases, a higher entropy value corresponds to a response where a respondent has provided a thoughtful response and expressed him or herself using descriptive language. Along similar lines, a lower entropy score corresponds to responses where the respondent is repetitive, such as reusing the same words and phrases.

While one method of determining an entropy value is illustrated above, other methods of determining an entropy value may be employed. For example, the entropy analyzer 116 may factor in the commonality of each character when determining an entropy value for a response. For example, the entropy analyzer 116 may weight the characters "q," "x," or "z" greater than the characters "e," "r," and "s" when determining an entropy value. As another example, in some cases, the entropy analyzer 116 may factor in the complexity of each word when determining an entropy value.

In addition to determining a length value and an entropy value, the response analyzer 106 can determine a readability value for responses. In particular, the readability evaluator 118 within the response analyzer 106 can determine a readability score for each response. A readability score may provide an indication of a response's readability. For example, the readability evaluator 118 may indicate an age range, grade level, or comprehension level to which the text in a response corresponds.

In some example embodiments, the readability evaluator 118 may determine a readability value using an Automated Readability Index (ARI). The readability evaluator 118 can employ the ARI to gauge the understandability of a text, such as the approximate US grade level needed to comprehend a response or overall level of comprehension. To illustrate, the ARI uses the following equation:

$$ARI = 4.71 \frac{\text{characters}}{\text{words}} + 0.5 \frac{\text{words}}{\text{sentences}} - 21.43$$

where characters is the number of letters, numbers, and punctuation marks in a response; words is the number of spaces in a response; and sentences is the number of sentences in the response. Accordingly, the readability evaluator 118 may use the ARI to determine a readability value for each response.

When applying the ARI to shorter passages of text, such as responses that include only a few sentences, the ARI may work differently than expected. As such, the ARI may not be the best indicator of overall comprehension level. For instance, the ARI may yield negative results when evaluating short passages of text. Nevertheless, the ARI may still be a useful tool in determining the usefulness of a response. In other words, rather than approximating a representative grade level needed to comprehend a response, the ARI may better indicate the presence of long-winded responses, over complicated responses, run-on sentences within a response. Thus, when the ARI is used to calculate a readability value for a response, a higher ARI score (i.e., a higher readability value) may yield a less interesting response, whereas a lower ARI indicates a more interesting response.

Additionally, because ARI incorporates the length of text passages by using characters in the ARI calculation, a readability value that is based on the ARI may be correlated with the length value, when the length value is based on the number of characters in a response. As such, some positive attributes of usefulness in the ARI score may be reflected in the length value when both the length value and the readability value are used to determine a notability value for a response, as described below.

Rather than determine readability based on the ARI, the readability evaluator 118 may employ other methods to determine a readability value, such as using the Laesbarhedsindex (LIX), which determines readability based on sentence length and the number of long words (i.e., words over six characters), or the RIX, which determines readability based on long words per sentence. Other examples of readability assessments that the readability evaluator 118 may employ include Accelerated Reader ATOS, Coleman-Liau Index, Dale-Chall Readability Formula, Flesch-Kincaid readability tests include Flesch Reading Ease and Flesch-Kincaid Grade Level, Fry Readability Formula, Gunning-Fog Index, Lexile Framework for Reading, Linsear Write, Raygor Estimate Graph, SMOG (Simple Measure Of Gobbledygook), and Spache Readability Formula.

Additionally or alternatively, the readability evaluator 118 may employ a number of other methods to determine a readability value, such as using a methodology that evaluates characters per syllable and/or syllables per word when determining readability. Further, the readability evaluator 118 may evaluate readability and determine a readability value based on the complexity of sentence structure and vocab used.

As mention above, the response analyzer 106 may perform additional analytics. For instance, the response analyzer 106 may analyze metrics associated with the response itself, such as the date and time the response was submitted or the duration of time from when the respondent received a request to complete a response item and when the respondent completed the response. For example, the response analyzer 106 can determine a recency value that is based the since the response was submitted (e.g., based on the date and time the respondent provided the response).

As another example, the response analyzer 106 can determine a willingness value based on the amount of time it took the responded to respond to a message requesting respondent participation. In some cases, the response analyzer 106 may determine a greater willingness value when the time between the response system 100 providing the request and the respondent providing a response is short because a short duration may indicate that the respondent was willing to provide feedback. In some cases, a short duration of time between when a respondent was notified about a response and provided feedback via the response may indicate that the respondent has already thought of feedback to provide, which may signal in an interesting and useful response. In some cases, a respondent may receive a receipt upon purchasing a product or service. In these cases, the response analyzer 106 may provide a greater willingness value to a response when the respondent completes the response for a product or service shortly after purchasing the product or service (e.g., the time duration between the purchase and response is small).

As another illustration, the response analyzer 106 can determine a response duration value that is based on the time it took a respondent to complete a response. In some cases, the response analyzer 106 may also base the response duration value on the length of a response. For example, if the response analyzer 106 determines that a respondent completed a lengthy response in a short amount of time, the response analyzer 106 may perform additional analytics to detect if the respondent provided gibberish, an emotional reaction, or even copied and pasted a previous answer into the response. If the response analyzer 106 detects that a lengthy response took a long duration of time, the response analyzer 106 may arrive at a higher response duration value because it is likely that a respondent took time to construct an interesting and useful response. Similarly, a short duration may indicate that a respondent sped through a response and likely did not fully consider his or her response. As such, the response analyzer 106 may provide a lower response duration value because recipients who speed through responses often do not provide interesting or useful feedback.

In some example embodiments, the response analyzer 106 can analyze responses to determine a keyword value. For instance, the response analyzer 106 can analyze a response to identify if the response includes one or more keywords. The response analyzer 106 may also apply different weight to various keywords in a response. Example keywords may include words found in the response item itself. To illustrate, if the response item is a question that asks, "What is your favorite feature of Product X," then the response analyzer 106 can search for the words "favorite," "feature," and "Product X" in a response. Other keywords may include products, companies, services, or words that indicate useful feedback. One of skill in the art will appreciate that the response analyzer 106 may identify and apply additional key words in determining a keyword value.

The response analyzer 106 may also analyze responses to determine a response editing value. The response editing value may indicate the level of editing (e.g., amounts of edits) that a respondent made when providing a response. For example, the response analyzer 106 may identify each time the respondent added or removed characters or words in between existing text. In general, a respondent that edits a response is reviewing the response, correcting errors, clarifying statements, and confirming the feedback provided in the response. Accordingly, greater amounts of editing (or amounts of editing above a threshold level) may indicate increased usefulness, and thus the response analyzer 106 may calculate a higher response editing value for a response that contains a higher amount of editing.

In some example embodiments, the response analyzer 106 may analyze a response and provide a user influence value based on the user profile of the respondent providing a response. For example, if the respondent holds an influential position in a company, such as vice president, then the response analyzer 106 may assign a higher user influence value than to a response completed by an unemployed person. Similarly, the response analyzer 106 may assign greater weight to the user influence value for a respondent who is in a position to make decisions for a business or company, such as a manager or officer.

In some example embodiments, the response analyzer 106 may analyze responses to determine a location value. The location may include whether a respondent was proximate to a location that would increase the usefulness of a respondent. For example, if a respondent submits a response to a response item regarding Restaurant X while the respondent is within Restaurant X, then the response analyzer 106 may give a greater location value than a response that is far away from Restaurant X. Similarly, the response analyzer 106 may assign a greater location value to a response for a product that is provided at a location associated with the product. For instance, the response analyzer 106 may give a favorable location value to a response regarding bowling shoes when a respondent submits the response at or near a bowling alley.

As mentioned above and as FIG. 2 illustrates, the response system 100 includes a notability manager 108. The notability manager 108 may determine a notability value for each response. The notability value can indicate the usefulness of a response. Accordingly, a higher notability value may indicate a more useful and interesting response than a lower notability value. In some embodiments, the notability manager 108 may determine notability values for non-noise responses. In alternative embodiments, the notability manager 108 can determine a notability value for all non-blank, or even all responses to a response item. In some cases, however, the notability manager 108 may assign blank and/or noise responses a notability value of zero or null.

Regardless of whether the notability manager 108 determines notability values for a portion or all responses to a response item, the notability manager 108 may determine notability values based on analytics determined for each response. In particular embodiments, the notability manager 108 may employ analytics and values assigned by the response analyzer 106 to generate a notability value for a response.

To illustrate, the notability manager 108 may generate a notability for a response based on the length value, entropy value, and/or readability value. In particular, the notability manager 108 can apply the following equation to determine a notability value (NV) for each response:

$$NV=0.00145908lv+0.4640869ev-0.00117445rv-0.065249$$

where lv is the length value of the response, ev is the entropy value of the response, and rv is the readability value of the response (using the ARI). Using the above equation, the notability manager 108 may generate a notability value for each response.

In some embodiments, the notability manager 108 may normalize the values used to generate a notability value. As such, when no additional weight is assigned, each value holds equal influence. In other words, if the length value, entropy value, and readability value are normalized and no additional weight is assigned to each value, then the notability value is based equally on the three values.

Rather than normalizing each value that the notability manager 108 uses to generate each notability value, the notability manager 108 may a coefficient to each value. To illustrate, in the above equation, the coefficient applied to the length value is 0.00145908, the coefficient associated with the entropy value 0.4640869, and the coefficient associated with the readability value is −0.0011745. Coefficients can represent the strength and type of relationship the length value, the entropy value, and the readability value have to the notability value. In addition, coefficients may be determined based on a regression analysis, such using as a ridge regression linear model, or another regression model known in the art.

As mentioned above, when determining a notability value using a length value based on characters in a response and a readability value based on an ARI score (which also factors in the number of characters in a response), the length value and the readability value may be cross-correlated. For example, in the above regression equation, there is a positive correlation (0.27) between the length value and the readability value. Therefore, the coefficients for the length value and the readability value reflect the correlation. Furthermore, to account for responses becoming less useful as the readability value increases, the coefficient for the readability value in the regression equation is negative (e.g., −0.0011745) rather than positive. In other words, while one would expect readability to be a positive influence in determining a notability value because higher readability appears to indicate a more useful response, the readability value in this case better indicates the presence of long-winded responses, over complicated responses, and run-on sentences in a response. This result occurs because the readability value is determined based on a sample size that is only a few sentences of text rather than numerous pages of text. As such, the notability manager 118 subtracts (or applies a negative coefficient to) the readability value when generating a notability value for a response While coefficients may help to normalize values, coefficients may also be used to apply varying weights to each value. For example, if the length value provides the highest indication of a useful response, the coefficient for the length value applied to the length value should typically yield a greater result than the coefficient for the entropy value applied to the entropy value. In the above equation, the length value may be the most influential in deciding a notability value, followed by the entropy value, followed by the readability value. In other embodiments, however, the entropy value or the readability value may be the most influential factor in generating a notability value.

In some example embodiments, the notability manager 108 may base the notability value on other factors and values when generating a notability value for a response. For example, the notability manager 108 may base a notability value on one or more of the following values: a recency value, a willingness value, a response duration value, a keyword value, a response editing value, a user influence value, or a location value. As described above, these additional values can provide indications of whether a response may be useful or interesting. Thus, the notability manager 108 may consider one or more of these factors when generating a notability value for a response. The notability manager 108 may apply different weights to each value, such as within an associated coefficient, as described above.

In one or more embodiments, the notability manager 108 may organize the notability values determined for a response item. For instance, after generating notability values for a set of responses to a response item and associated the notability values with their corresponding responses, the notability manager 108 may rank the responses based on the notability values. For example, the notability manager 108 may rank responses with the highest notability values above responses with lower notability values.

After organizing responses, the notability manager 108 may provide the responses to a reviewer. The notability manager 108 may provide the responses to a reviewer in an organized manner, such as ranked according to notability values. In some instances, the notability manager 108 may filter out or hide responses that do not meet a threshold notability value. For example, the notability manager 108 may hide responses that do not meet a minimum notability value for usefulness (e.g., hide responses below a 1.2 notability value). Alternatively, the notability manager 108 may only provide the reviewer with a set number of responses for a response item, such as the top ten (10) useful responses per response item. In any case, the notability manager 108 may provide the reviewer an option to view additional response (e.g., view the next ten (10) highest ranked responses), or even view the remainder of the responses for a response item or for all response items in the set of response items (e.g., view all responses).

In some example embodiments, the notability manager 108 may allow the reviewer to apply additional filters to the responses provided to the reviewer. For example, the notability manager 108 may allow the reviewer to apply additional values, such as the response duration value, keyword value, response editing value, etc. In some embodiments, notability manager 108 may regenerate notability values for a set of responses based on additional or fewer values.

The notability manager 108 may provide organized responses to a reviewer in a simplified and compact manner. For example, the notability manager 108 may provide a reviewer a preview of the first line of a group of responses along with the notability value associated with each response. In this manner, the notability manager 108 may allow the reviewer to see a portion of each response along with how each response compares to other responses for the same response item (e.g., if two responses have similar notability values, multiple responses are group in notability value clusters, or there is a large notability value gap between two responses). Upon selecting a response, the notability manager 108 may expand the response to allow the reviewer to view the entire response.

Overall, the response system 100 may identify and provide a reviewer with responses organized according to usefulness. Further, the response system 100 may provide an indication to a reviewer as to how each response in a set of responses relates to each other in terms of usefulness. Even with a large number of responses in the hundreds of thousands, the response system 100 can quickly determine notability values for each response. In addition, the response system 100 can generate notability values for additional responses as respondents provide the additional responses and rank the additional responses among previously ranked responses. In some cases, the response system 100 may not identify all responses that are useful, however, the response system 100 may greatly cull the majority of uninteresting/ noise responses (e.g., the response system 100 may reduce uninteresting responses by 90%).

As mentioned above, one advantage of embodiments disclosed herein is that the response system 100 can determine a notability value for responses across multiple languages. In other words, the response system 100 may use values such as length values, entropy values, readability values, recency values, etc., which are not specific to a particular language, to determine a notability value for any response. Further, the response system 100 can compare, organize, and rank the usefulness of multiple responses to each other, even when the responses are provided in different languages.

Figure 2:
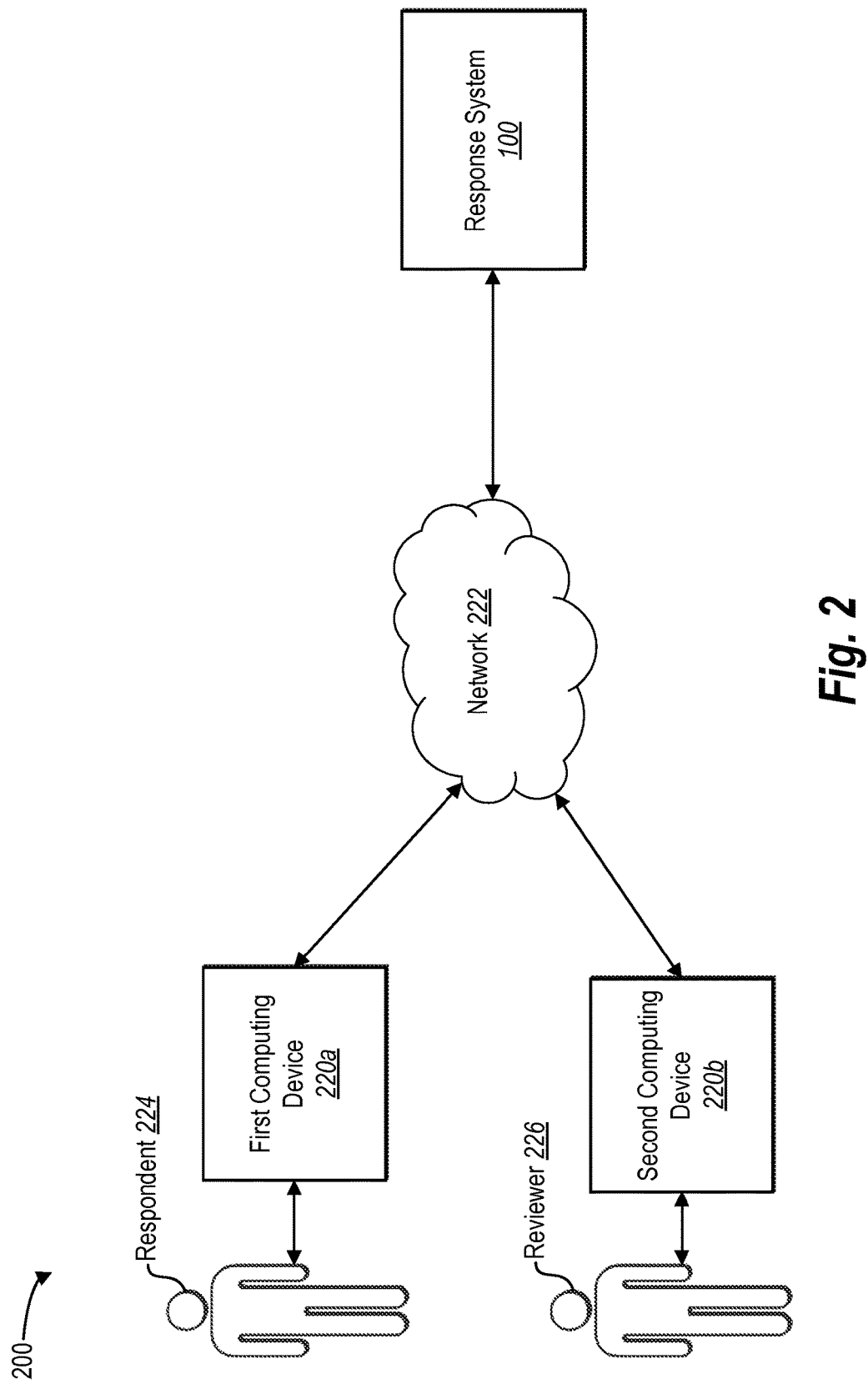
FIG. 2 illustrates a schematic diagram of an exemplary communication system that includes the response system of FIG. 1 in accordance with one or more embodiments.

FIG. 2 illustrates a communication system 200 that includes the response system 100 in accordance with one or more embodiments disclosed herein. As illustrated, the communication system 200 includes a first computing device 220a and a second computing device 220b (collectively referred to as "computing devices") connected to the response system 100 via a network 222. Although FIG. 2 illustrates a particular arrangement of the computing devices, the response system 100, and the network 222, various additional arrangements are possible. For example, the first computing device 220a may directly communicate with the response system 100, bypassing the network 222.

As mentioned, the computing devices and the response system 100 may communicate via the network 222. The network 222 may include one or more networks, such as the Internet, and may use one or more communications platforms or technologies suitable for transmitting data and/or communication signals. Additional details relating to the network 22 are explained below with reference to FIGS. 6 and 7.

As illustrated in FIG. 2, a respondent 224 may interface with the first computing device 220a, for example, to access the response system 200. The respondent 224 may be an individual (i.e., human user), a business, a group, or other entity. Although FIG. 2 illustrates only one respondent 224, it is understood that communication system 200 can include a plurality of respondents, with each of the plurality of respondents interacting with the communication system 200 with a corresponding computing device.

The first computing device 220a and the second computing device 220b may each represent various types of computing devices. For example, each of the computing devices may be a mobile device (e.g., a mobile telephone, a smartphone, a PDA, a tablet, a laptop, a camera, a tracker, a watch, a wearable device, etc.). In some embodiments, however, one or both of the computing devices may be a non-mobile device (e.g., a desktop or server; or another type of client device). Additional details with respect to the computing devices are discussed below with respect to FIG. 6.

The respondent 224 may interact with the response system 100. To illustrate by way of example, the response system 100 may provide the respondent 224 access to one or more response items. For example, the response system 100 may provide a survey to the respondent 224 that includes questions or prompts that require textual feedback. In another example, the response system may provide a text field on a website or in a message that allows the respondent to provide a textual response.

In response, the respondent 224 may complete the survey or leave feedback in reaction to a prompt. In other words, the respondent 224 may provide one or more textual responses to the response system 100. Upon the respondent 224 providing each textual response, or upon a number of respondents answering a response item, the response system 100 can filter out responses that are blank and/or are noise. For example, the response system 100 can identify and filter out responses that do not include at least four (4) different parts of speech as noise responses, and as described above.

After filtering out responses that are noise, the response system 100 may access and/or analyze the remaining responses. For instance, the response system 100 may analyze each non-noise response for a response item to determine one or more analytic values, such as a length value, an entropy value, a readability value, a willingness, value, a recency value, a response duration value, a response editing value, a location value, etc., corresponding to each response.

Using the analytic values determined from the responses, the response system 100 can determine a notability value for each response. In one or more embodiments, as described above, the response system 100 may determine a notability value using the length value, the entropy value, and the readability value associated with the response. In some cases, the response system 100 may favor the length value over the entropy value and the readability value by assigning a greater weight to the length value. Further, the response system 100 may also favor the entropy value over the readability value. For example, in a particular embodiment, the response system 100 may generate a notability value for a response by adding the length value times a length coefficient to the entropy value times an entropy coefficient, then and subtracting the readability value times a readability coefficient as well as subtracting a residual error value.

Once the response system 100 generates one or more notability values and associates the notability values with corresponding responses, the response system 100 may provide the notability values to a reviewer 226. For example, the response system 100 may provide the notability values to the reviewer using the second computing device 220b.

As discussed above, the reviewer 226 may be a person that reviews responses. Often, a reviewer is connected to a company, product, and/or service to which response items correspond. For example, if the response items are part of a survey for a company's product, the reviewer may be an employee of the company. In some cases, the reviewer may be responsible for the creation of the set of response items given to respondents. In other cases, the reviewer may be apart from the person who requested or created the set of response items.

Returning to FIG. 2, the reviewer 226 may access responses on the response system 100 via the second computing device 220b. When accessing the responses, the response system 100 may organize and/or rank the responses according to the responses notability values. In this manner, the response system 100 may provide useful and interesting responses first to the reviewer 226.

Figure 3:
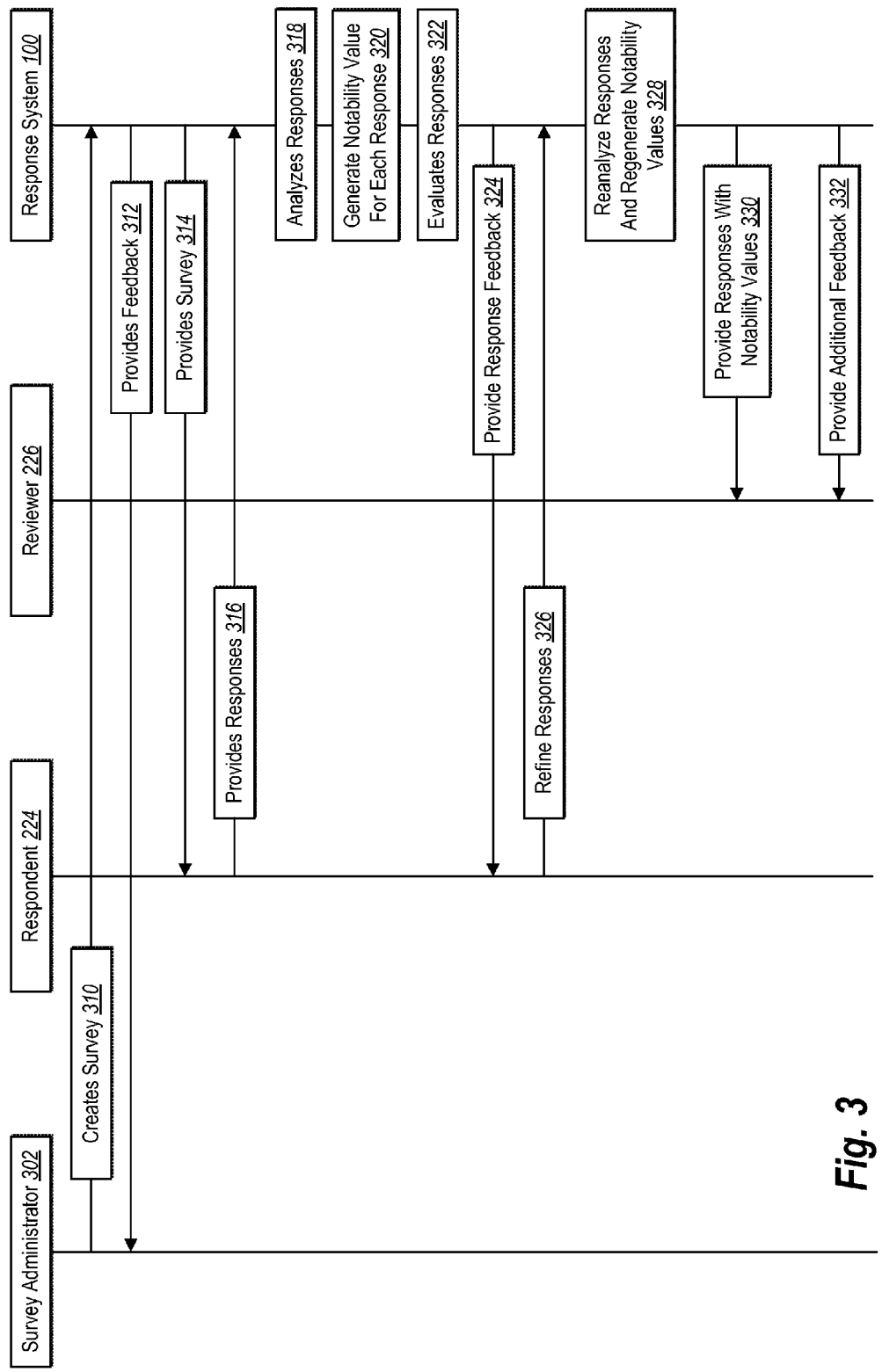
FIG. 3 illustrates an example sequence-flow diagram showing interactions between a survey administrator, a respondent, a reviewer, and the response system in accordance with one or more embodiments.

Because the response system 100 can determine notability values for responses and identify useful responses based on notability values, the response system 100 can be used in a number of ways. To illustrate, FIG. 3 shows a sequence-flow showing interactions between a survey administrator 302, a respondent 224, a reviewer 226, and the response system 100. The survey administrator 302 may create and organize a survey. In some embodiments, the survey administrator 302 may be the same person, as the reviewer 226. In other embodiments, the survey administrator 302 and the reviewer 226 may be different people.

As illustrated in step 310 of FIG. 3, the survey administrator 302 may create a survey. The survey may include one or more response items, such as questions and/or prompts. In particular, the survey may include one or more questions or prompts that solicit textual response from respondents. The response system 100 may assist the survey administrator 302 in creating the survey, as described above.

In some example embodiments, the survey administrator 302 may provide feedback to the survey administrator 302, as shown in step 312. For example, for each question in the survey, the response system 100 may evaluate the question using similar methods described above and indicate to the survey administrator 302 whether the question appears to be useful or interesting. For example, the response system 100 may analyze a question to determine analytic values, such as a length value, an entropy value, and/or a readability value, and generate a notability value for the question. Using the notability value, the response system 100 may indicate to the survey administrator 302 what notability value the question received or an indication of whether the question was determined to be useful. The survey administrator 302 may then edit, modify, or remove the question from the survey.

When evaluating questions for usefulness or if the question is interesting, the response system 100 may apply the same coefficients and weighting when evaluating the usefulness of responses. Alternatively, the response system 100 may apply different weights and coefficients. To illustrate, because questions are typically one sentence, and generally contain fewer words rather than more words, the response system 100 may weight readability and entropy higher than length. Further, the response system 100 can include additional factors and weights when determine a notability value for a question.

Step 314 in FIG. 3 illustrates the response system 100 providing the survey to the respondent 224. After completing responses for one or more survey questions, the response system 100 may receive the responses provided by the recipient, shown in step 316. As described above, the response system 100 may analyze the responses, shown in step 318, and generate notability values for each response, shown in step 320.

In step 322, the response system 100 may evaluate the responses to determine whether, based on notability values, the response system 100 can improve the usefulness of responses. For example, in some example embodiments, the response system 100 may assist a respondent 224 in providing better responses to a response item. To illustrate, a respondent 244 may provide a textual answer to a survey question, such as, "What could we do to raise your satisfaction with Product X?" Upon the respondent 224 providing a response, the response system 100 may evaluate the response, shown in step 322, and determine if the response meets a minimum usefulness or interest level (e.g., the notability value for the response is above a predetermined threshold).

Depending on the usefulness of the response, the response system 100 may determine whether to re-ask the question, or to ask the respondent additional follow-up questions, as shown in step 324. For instance, if the response is blank and/or is noise, the response system 100 may ask the same question again or may reword the question to see if the respondent 224 will provide a more useful response. For instance, the response system 100 could ask as a follow up question, "What don't you like about Product X?" Additionally or alternatively, the response system 100 can follow-up with categorical questions that the respondent is more likely to answer, such as, "Which area could we focus on to improve you satisfaction with Product X?" and present multiple choices to the user.

In some example embodiments, the response system may provide response feedback, shown in step 324, in the form of an indication, such as a ranking, grade, or numerical score, to the respondent 224 after the respondent 224 provides a response. For instance, the response system 100 can use the notability value of a response to tell the respondent 224 if he or she provided a great response, good response, average response, or even a poor response. In some cases, the response system 100 may allow the respondent 224 to edit his or her response to try to provide an improved response, shown as step 326. Additionally or alternatively, the response system 100 may provide the respondent an indication of how their response compared to others respondents, such as a ranking or percentile comparison to other respondents.

If a respondent 224 does edit, modify, or replace a response, the response system 100 may reanalyze the response and regenerate notability values, illustrated in step 328. For example, if the respondent 224 does change his or her answer, the response system 100 may compare the new answer to the old answer based on the notability values. The response system 100 may store both answers or keep only the answer with the higher notability value. Further, the response system 100 may provide the new rating or score or a comparison of that indicates the differences in notability values to the respondent 224, such as if the respondent 224 provided an improved response or if the previous response was better.

As shown in step 330 and as described above, the response system 100 may provide the responses to the reviewer 226. For example, the reviewer 226 may request to view the responses to the survey, and the response system 100 may provide the responses to the reviewer 226 ranked according to usefulness, as indicated by each responses' notability value. In some example embodiments, the response system 100 may also provide additional feedback to the reviewer 226, as shown in step 332.

As an example of additional feedback, the response system 100 may provide the reviewer 226 with a per-question statistical breakdown of responses based on notability values. Examples of statistical feedback may include, but is not limited to an average notability of responses values per question, questions that yielded responses with the highest and lowest notability values, the number responses that had notability values above a threshold (e.g., a usefulness threshold) for each question, the number of responses that were noise for each question, the number of responses that had notability values within a predetermined range (e.g., responses that had notability values that were not noise, but below a usefulness threshold), the standard deviation of one or more notability values per question, and best/worst overall responses per response item or for a set of responses.

As a further example, the response system 100 may provide the reviewer 226 with a question quality analysis based on response notability values. For example, the response system 100 may indicate to the reviewer 226 the questions that yielded the highest notability values and the questions that yielded the lowest notability values. Using this information, the reviewer 226 can identify which questions, or which types of questions, in general, yield responses that are more useful and which question yield less useful, or even useless responses.

Further, the response system 100 can take note of when a question used in one or more surveys yields useful responses. For example, if a question or a variation of a question is used in multiple surveys and the question results in responses that are useful, or more useful than other questions on average, then the response system 100 may recommend to the survey administrator 302 to include the question in one or more other surveys, when relevant.

Further, using information indicating which questions determine poor notability values, the reviewer 226 can determine whether or not to eliminate a question that primarily yields uninteresting and useless responses. In some example embodiments, the response system 100 may remove a question that constantly yields notability values below a threshold value, even when noise responses are filtered out. Because some questions may tend to result in lower notability values, the threshold to remove a question may be specific to each question. In some cases, the threshold may be based on notability values the response system obtains from other survey responses having the same question. In some cases, the response system 100 may use a moving average of notability values for multiple responses to a question to determine when to remove a question. For instance, if the moving average of notability values for a response drops a predetermined amount or falls below a threshold value, the drop in notability values may indicate that the question, which was once relevant and yielded useful response, is no longer relevant to respondents.

Rather than removing a question when notability values for responses decrease, in one or more embodiments, the response system 100 may replace the question with another question or reword the question. Additionally or alternatively, the response system 100 may send a notification to the reviewer 226 and/or survey administrator 302 indicating that a question is not yielding useful responses or that the response level of usefulness is decreasing for a question.

In some example embodiments, the response system 100 may allow a reviewer 226 to provide feedback to the response system 100 indicating whether a response was useful, not useful, or noise. The response system 100 may compare the feedback from the reviewer 226 to the notability value for the response and what factors and values were used to arrive at the notability value. If reviewers find a number of responses with higher notability values less useful, the response system 100 may adjust the weights, coefficients, and values used to arrive at the notability values so that future notability values may more accurately reflect a response's usefulness. In this manner, the response system 100 can use feedback from reviewers to confirm or improve the equation, regression, model, and/or methodology to determine notability values for responses.

Figure 4:
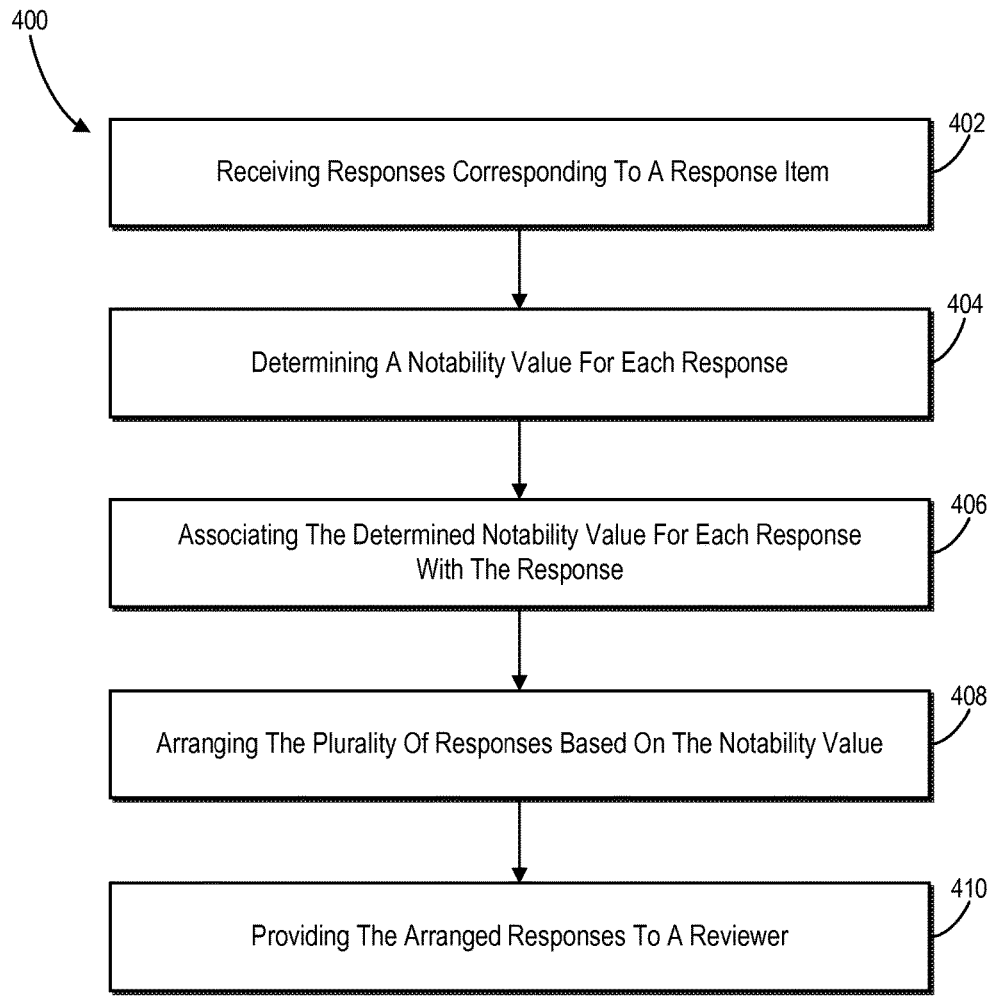
FIG. 4 illustrates a flowchart of an exemplary method for organizing responses in accordance with one or more embodiments.
Figure 5:
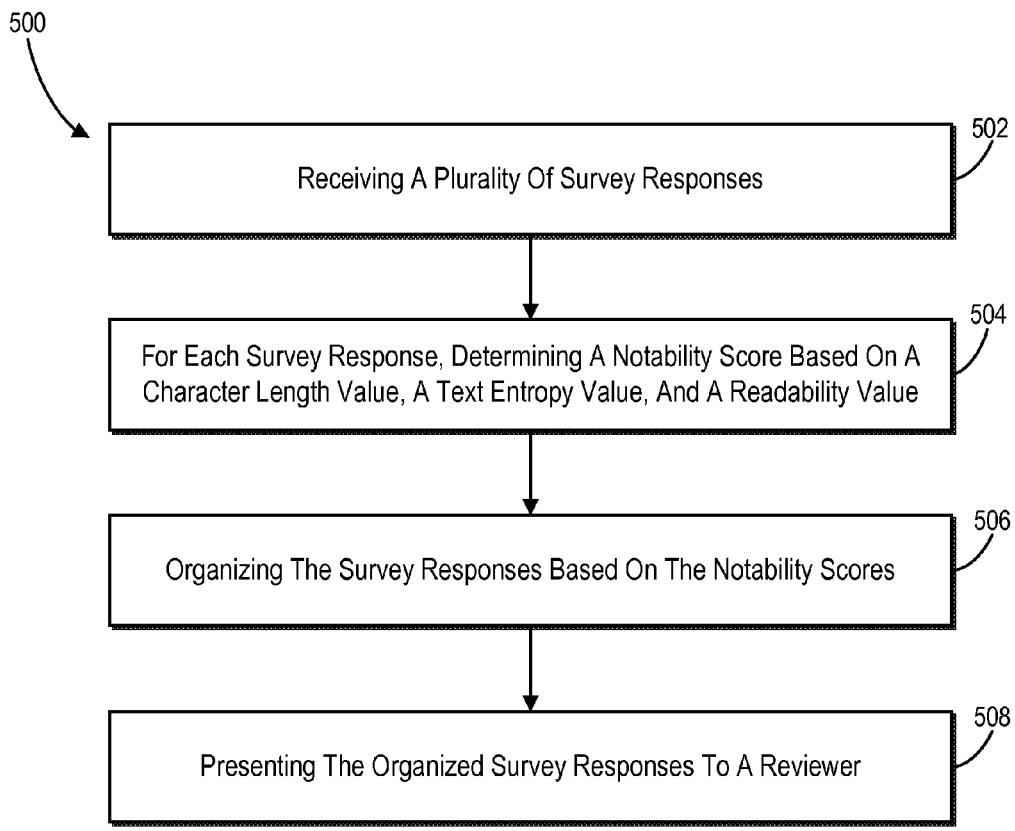
FIG. 5 illustrates a flowchart of an exemplary method for ranking survey responses in accordance with one or more embodiments.

FIGS. 1-3, the corresponding text, and the examples, provide a number of different systems, devices, and graphical user interfaces for providing merchant insights to a merchant. In addition to the foregoing, embodiments disclosed herein also can be described in terms of flowcharts comprising acts and steps in a method for accomplishing a particular result. For example, FIGS. 4-5 illustrate flowcharts of exemplary methods in accordance with one or more embodiments disclosed herein. The methods described in relation to FIGS. 4-5 can be performed with less or more steps/acts or the steps/acts can be performed in differing orders. Additionally, the steps/acts described herein can be repeated or performed in parallel with one another or in parallel with different instances of the same or similar steps/acts.

FIG. 4 illustrates a flowchart of an example method 400 for organizing responses in accordance with one or more embodiments disclosed herein. Method 400 can be implemented by the response system. The method 400 includes an act 402 of receiving responses corresponding to a response item. In particular, the act 402 may involve receiving a plurality of responses corresponding to a response item, each response of the plurality of responses being provided by a respondent 224. For example, the act 402 may involve the respondent 224 providing a text response to the response system 100.

In addition, the method 400 further includes an act 404 of determining a notability value for each response. In particular, the act 404 may involve determining a notability value for each response of the plurality of responses. For example, determining the notability value for each response may include determining a notability value for each response based on the length value, entropy value, and readability value determined for each response. Further, determining the notability value for each response may include adding the length value times a length coefficient to the entropy value times an entropy coefficient and subtracting the readability value times a readability coefficient. In some example embodiments, determining the notability value for each response may be based on a date of the response, the duration of time to complete the response, a response editing amount, a location of the response, or keywords in the response. In addition, determining the notability value for each response may be based on user information associated with the respondent of the response.

Further, the method 400 includes an act 406 of associating the determined notability value with each response. In particular, the act 406 may involve associating the determined notability value for each response of the plurality of responses with the response used to determine the notability value. For instance, the act 406 may involve mapping the notability values determined for each response to their corresponding responses, in any suitable manner disclosed herein.

The method 400 also includes an act 408 of arranging the responses based on the notability values. In particular, the act 408 may involve arranging the plurality of responses based on the notability value associated with each response. For example, the act 408 may involve ordering and/or prioritizing each response based on the notability value associated with each response, in any suitable manner described herein.

In addition, the method 400 also includes an act 410 of providing the arranged responses to a reviewer. In particular, the act 410 may involve providing, to a reviewer 226, one or more arranged responses. For example, the act 410 may involve displaying the responses in a prioritized manner to the reviewer 226, in any suitable manner described herein.

The method 400 may also involve analyzing parts of speech for each response of the plurality of responses. In particular, analyzing the parts of speech for each response may include tokenizing the response to identify words in the response. comparing each word in the response to a first part of speech, a second part of speech, a third part of speech, and a fourth part of speech, and indicating whether the response includes the first part of speech, the second part of speech, the third part of speech, and the fourth part of speech.

FIG. 5 illustrates a flowchart of another example method 500 for ranking survey responses in accordance with one or more embodiments disclosed herein. Method 500 can be implemented by the response system 100. The method 500 includes an act 502 of receiving a plurality of survey responses. In particular, the act 502 may involve receiving a plurality of survey responses that correspond to a survey item. For example, the act 402 may involve the respondent 224 providing a text survey response to the response system 100.

Further, the method 500 includes, for each survey response, an act 504 of determining a notability score based on a character length value, a text entropy value, and a readability value. In particular, for each survey response of the plurality of survey responses, the act 504 may involve determining a character length value, a text entropy value, and a readability value and determining a notability score based on the character length value, the text entropy value, and the readability value. For example, the act 504 may involve determining a notability value for each survey response based on applying a regression model using the character length value, the text entropy value, and the readability value. Further, the act 504 may involve determining a notability value for each survey response based on whether a survey response includes parts of speech, the parts of speech comprising a noun, a verb, an adverb, and an adjective, and where a parts of speech is included in a parts of speech dictionary.

Additionally, the method 500 includes an act 506 of organizing the survey responses based on the notability scores. In particular, the act 506 may involve organizing the plurality of survey responses based on the notability score determined for each survey response. For example, the act 506 may involve ordering and/or prioritizing each survey response based on the notability value associated with each response, in any suitable manner described herein.

Further, the method 500 includes an act 508 of presenting the organized survey responses to a reviewer. In particular, the act 508 may involve presenting the organized plurality of survey responses to a reviewer 226 along with the notability score corresponding to each survey response. For example, the act 508 may involve displaying the survey responses in a prioritized manner to the reviewer 226, in any suitable manner described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
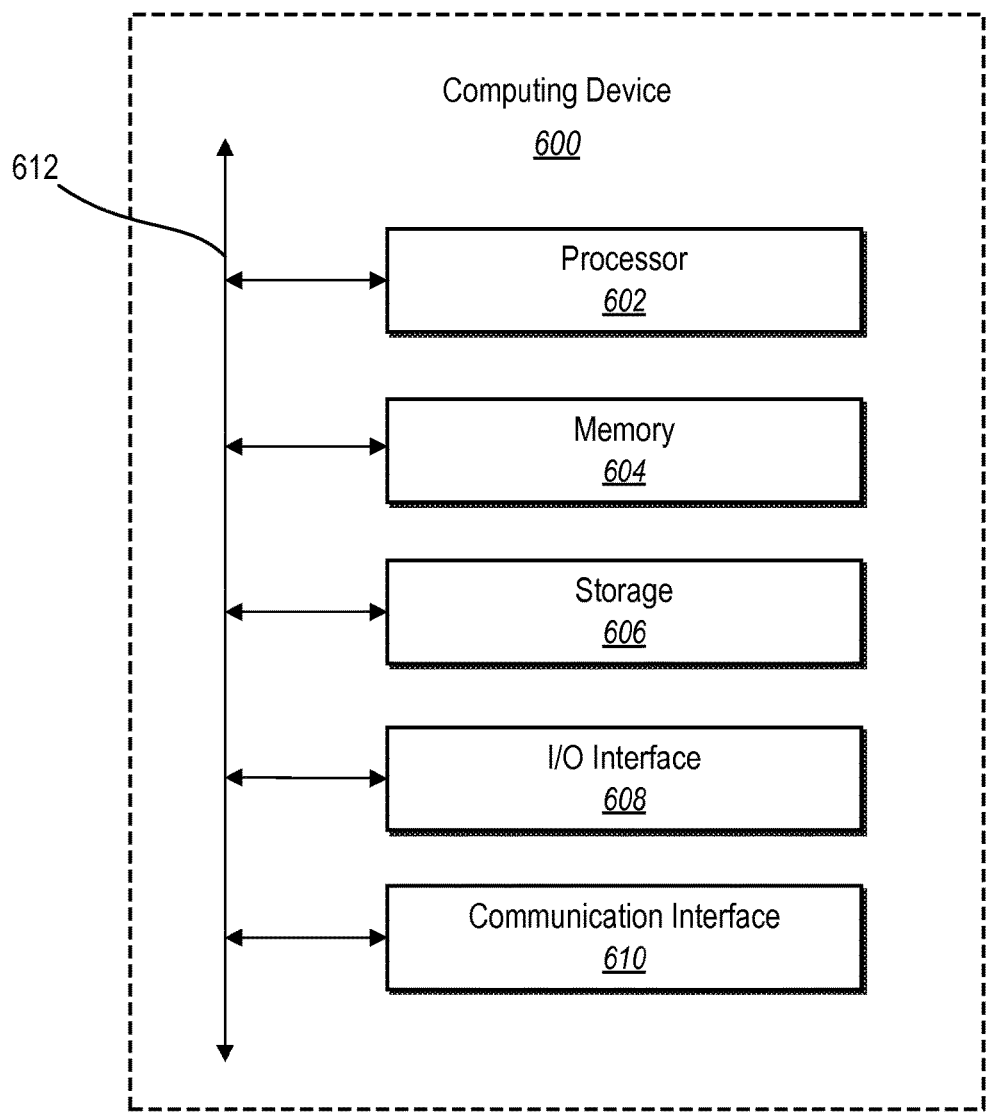
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the response system 100 and/or computing device 220a-b. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
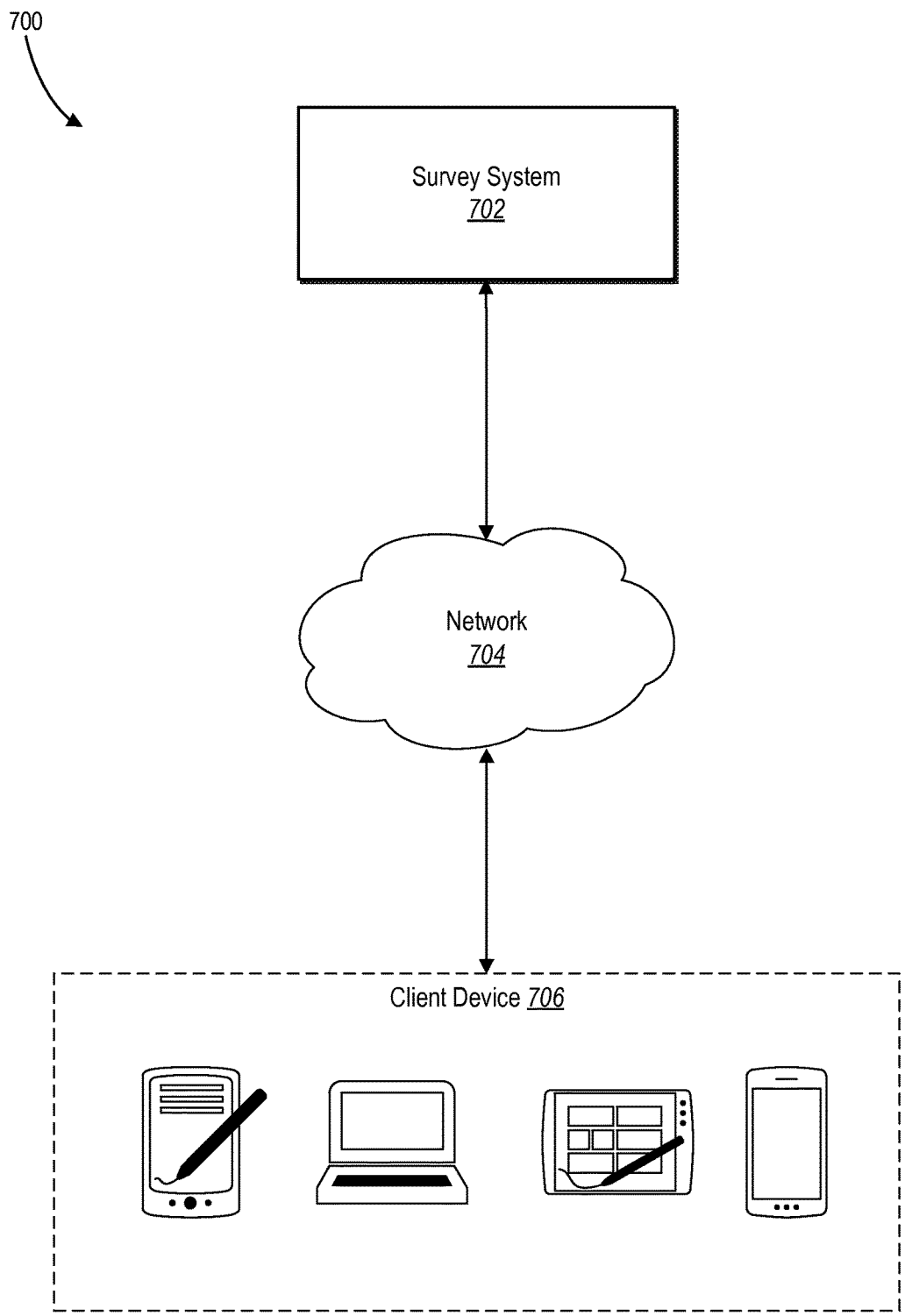
FIG. 7 is an example network environment of a response system in accordance with one or more embodiments.

FIG. 7 illustrates an example network environment 700 of a survey system. Network environment 700 includes a client system 706, and a survey system 702 connected to each other by a network 704. Although FIG. 7 illustrates a particular arrangement of client system 706, survey system 702, and network 704, this disclosure contemplates any suitable arrangement of client system 706, survey system 702, and network 704. As an example and not by way of limitation, two or more of client system 706, and survey system 702 may be connected to each other directly, bypassing network 704. As another example, two or more of client system 706 and survey system 702 may be physically or logically co-located with each other in whole, or in part. Moreover, although FIG. 7 illustrates a particular number of client systems 706, survey systems 702, and networks 704, this disclosure contemplates any suitable number of client systems 706, survey systems 702, and networks 704. As an example and not by way of limitation, network environment 700 may include multiple client system 706, survey systems 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706, and survey system 702 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include any of the computing devices discussed above in relation to FIG. 6. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey system 702 may include a variety of servers, sub-systems, programs, modules, logs, and data stores. In particular embodiments, survey system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey system 702 may also include suitable components such as network interfaces, security mechanisms, load balancers, failover servers, management-and-network-operations consoles, other suitable components, or any suitable combination thereof.

In particular embodiments, survey system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method for organizing responses, the method comprising:
   extracting, by at least one server, a plurality of responses corresponding to a response item, the plurality of responses being provided by one or more respondents;
   analyzing each response of the plurality of responses to determine an entropy value for each response;
   determining a willingness value for each response of the plurality of responses based on an amount of time between providing a response request and receiving a subsequent response;
   associating the determined willingness value for each response of the plurality of responses with the response used to determine the willingness value;
   determining a notability value for each response of the plurality of responses based at least in part on the entropy value of each response and further based on the willingness value of each response;
   associating the determined notability value for each response of the plurality of responses with the response used to determine the notability value;
   filtering out any responses of the plurality of responses that have a notability value below a threshold;
   ranking unfiltered responses of the plurality of responses according to their respective notability values; and
   providing, for display on a client device, an insight interface that presents the unfiltered responses in order of ranking and without the filtered responses.

2. The method of claim 1, wherein each response of the plurality of responses is a text response provided by a respondent.

3. The method of claim 1, further comprising analyzing each response of the plurality of responses to determine a length value and a readability value.

4. The method of claim 3, wherein determining the notability value for each response is further based on the length value and the readability value of each response.

5. The method of claim 4, wherein determining the notability value for each response comprises adding the length value times a length coefficient to the entropy value times an entropy coefficient and subtracting the readability value times a readability coefficient.

6. The method of claim 5, wherein the notability value for each response of the plurality of responses is further determined based on at least one of a date of the response, a duration of time to complete the response, a response editing amount, a location of the response, or keywords.

7. The method of claim 1, wherein the notability value for each response of the plurality of responses is further determined based on user information associated with the respondent of the response.

8. The method of claim 1, further comprising analyzing parts of speech for each response of the plurality of responses.

9. The method of claim 8, wherein analyzing the parts of speech for each response comprises:
   tokenizing the response to identify words in the response;
   comparing each word in the response to two or more parts of speech; and
   indicating whether the response includes the two or more parts of speech.

10. The method of claim 9, wherein determining the notability value for each response of the plurality of responses is further based on each response having the two or more parts of speech.

11. The method of claim 9, wherein comparing each word in the response to the two or more parts of speech comprises matching each word in the response to a parts of speech dictionary to identify whether each word is included in the parts of speech dictionary.

12. The method of claim 9, wherein the two or more parts of speech comprise at least a noun, a verb, an adverb, and an adjective; and wherein indicating whether the response includes the two or more parts of speech, comprises indicating whether the response includes at least a noun, a verb, an adverb, and an adjective.

13. A non-transitory computer readable medium comprising instructions that, when executed by at least one processor, cause a computer device to:
extract, by at least one server, a plurality of responses corresponding to a response item, the plurality of responses being provided by one or more respondents;
analyze each response of the plurality of responses to determine an entropy value for each response;
determine a willingness value for each response of the plurality of responses based on an amount of time between providing a response request and receiving a subsequent response;
associate the determined willingness value for each response of the plurality of responses with the response used to determine the willingness value;
determine a notability value for each response of the plurality of responses based at least in part on the entropy value of each response and further based on the willingness value of each response;
associate the determined notability value for each response of the plurality of responses with the response used to determine the notability value;
filter out any responses of the plurality of responses that have a notability value below a threshold;
rank unfiltered responses of the plurality of responses according to their respective notability values; and
provide, for display on a client device, an insight interface that presents the unfiltered responses in order of ranking and without the filtered responses.

14. The non-transitory computer readable medium of claim 13, wherein each response of the plurality of responses is a text response provided by a survey respondent.

15. The non-transitory computer readable medium of claim 13, wherein the notability value is further based on a readability value, wherein the instructions further cause the computer device to determine the readability value by applying a regression model using the readability value.

16. The non-transitory computer readable medium of claim 13, further comprising instructions that, when executed by the at least one processor, cause the computer device to determine, for each response of the plurality of responses, whether each response includes two or more parts of speech.

17. The non-transitory computer readable medium of claim 16, wherein the notability value is further based on a character length value.

18. The non-transitory computer readable medium of claim 15, wherein the readability value is an automated readability index value.

19. The non-transitory computer readable medium of claim 18, wherein a higher automated readability index value for a response corresponds to a lower notability value for the response.

20. A system for organizing responses, the system comprising:
at least one processor; and
at least one non-transitory computer readable storage medium storing instructions thereon that, when executed by the at least one processor, cause the system to:
receive a plurality of responses corresponding to a response item, the plurality of responses being provided by one or more respondents;
analyze each response of the plurality of responses to determine an entropy value for each response;
determine a willingness value for each response of the plurality of responses based on an amount of time between providing a response request and receiving a subsequent response;
associate the determined willingness value for each response of the plurality of responses with the response used to determine the willingness value;
determine a notability value for each response of the plurality of responses based at least in part on the entropy value of each response and further based on the willingness value of each response;
associate the determined notability value for each response of the plurality of responses with the response used to determine the notability value;
filter out any responses of the plurality of responses that have a notability value below a threshold;
rank unfiltered responses of the plurality of responses according to their respective notability values; and
provide, for display on a client device, an insight interface that presents the unfiltered responses in order of ranking and without the filtered responses.

* * * * *